United States Patent [19]

Nozik

[11] 4,090,933
[45] May 23, 1978

[54] PHOTOELECTROLYSIS OF WATER BY SOLAR RADIATION

[75] Inventor: Arthur J. Nozik, Summit, N.J.

[73] Assignee: Allied Chemical Corporation, Morris Township, N.J.

[21] Appl. No.: 745,030

[22] Filed: Nov. 26, 1976

Related U.S. Application Data

[63] Continuation-in-part of Ser. No. 632,557, Nov. 17, 1975, Pat. No. 4,011,149.

[51] Int. Cl.$^2$ .......................... C25B 1/04; H01M 6/30
[52] U.S. Cl. .................................... 204/129; 204/278; 429/111
[58] Field of Search ............................... 204/129, 278; 136/89 NB; 429/111

[56] References Cited

U.S. PATENT DOCUMENTS 3,925,212  12/1975  Tchernev .......................... 250/527
3,989,542  11/1976  Clark ..................................... 136/89

OTHER PUBLICATIONS

H. Yoneyama et al., "A Photoelectrochemical Cell with Production of Hydrogen & Oxygen by a Cell Reaction", *Electrochimica Acta*, vol. 20, pp. 341-345 (1975).

Primary Examiner—Aaron Weisstuch
Attorney, Agent, or Firm—Ernest D. Buff

[57] ABSTRACT

Photoelectrolysis of water by solar radiation to produce hydrogen is achieved using semiconducting thin film electrodes. The cell comprises (a) an anodic electrode comprising at least one thin n-type semiconducting layer which has a bandgap ranging from about 0.5 to 4.0 eV and which is disposed on a supporting conductive substrate; (b) a cathodic counter-electrode comprising at least one thin p-type semiconducting layer which has a bandgap ranging from about 0.5 to 4.0 eV and which is supported on a supporting conductive substrate, the p-type layer adjacent the n-type layer being such that incident solar radiation impinges substantially simultaneously on both the n- and p-type electrodes; (c) means for retaining an electrolyte in contact with the exposed surfaces of the n- and p-type semiconducting electrodes; (d) external bias means between the electrode and the counter-electrode for biasing the cell with from 0 to about 1 V; and (e) means for collecting hydrogen and any oxidation products produced.

51 Claims, 5 Drawing Figures

PHOTOELECTROLYSIS OF WATER BY SOLAR RADIATION

This is a continuation-in-part of application Ser. No. 632,557, filed Nov. 17, 1975, now U.S. Pat. No. 4,011,149, issued Mar. 8, 1977.

BACKGROUND OF THE INVENTION

1. Field of the Invention

The invention relates to the production of hydrogen and oxygen by the electrolysis of water and, more particularly, to the production of hydrogen by the photoelectrolysis of water using solar radiation.

2. Description of the Prior Art

Two areas that have recently received considerable attention are solar energy conversion and the use of hydrogen as the ultimate fuel for the distribution and interconversion of energy (the hydrogen economy). A coupling of solar energy conversion with the hydrogen economy may produce a solution to both energy resource depletion and environmental pollution problems. Such a coupling may be effected by photolysis, in which sunlight is used to directly decompose water into hydrogen and oxygen. Preferably, semiconductor electrodes may be employed to facilitate photolytic decomposition by a process known as photoelectrolysis. A simple model for such a process can be described in terms of conventional photovoltaic devices which comprise an n-p junction. In photoelectrolytic devices, the n-p junction is replaced by an n-electrolyte-p (or metal) junction. Electron-hole pairs are generated by the absorption of light in both semiconductor electrodes. The electron-hole pairs are separated by the semiconductor-electrolyte junction barrier and are injected at the respective electrodes to produce electrochemical oxidation and reduction reactions.

For an n-type electrode, holes combine with hydroxyl ions ($OH^-$) to produce an anodic oxidation reaction; the reverse process occurs at a p-type or metal electrode where electrons combine with protons ($H^+$) to produce a cathodic reduction reaction. The net effect is a flow of electrons from the n-electrode to the p-electrode resulting in reduction at the latter ($H_2$ formation) and oxidation at the former ($O_2$ formation).

The attractiveness of photoelectrolysis is that it solves the energy storage problem which plagues the practical implementation of solar energy conversion, and at the same time it has the potential for providing an inexpensive source of hydrogen. However, the current use of single crystal electrodes, which are inherently expensive, and economic considerations relating to other aspects of the cell design, limit its current use. New and more efficient cell designs and materials are required in order to realize the potential of photoelectrolysis.

A photoelectrolysis cell consisting of thin film n- and p-type semiconducting electrodes of different compositions has been disclosed in U.S. Pat. No. 3,925,212, issued Dec. 9, 1975 to D. Tchernev. In this cell, however, the n- and p-type electrodes are arranged in a "spaced" configuration such that sunlight must sequentially pass first through a large bandgap electrode before reaching a small bandgap electrode. The light that is absorbed in the smaller bandgap electrode consists only of light not absorbed in the large bandgap electrode. This cell configuration suffers from the disadvantage that the large bandgap electrode must be supported on a highly transparent and highly conducting substrate. Such substrates are rare, expensive and difficult to manufacture with both sufficiently high transparency to sunlight and sufficiently high conductivity to produce photoelectrolysis cells of high efficiency.

Further, in the cell configuration in U.S. Pat. No. 3,925,212 the areas of the n- and p-type electrodes are equal. However, for optimum efficiency, the relative areas of the n- and p-type electrodes must be adjusted such that equal rates of formation of electron-hole pairs are produced when the cell is illuminated with sunlight.

SUMMARY OF THE INVENTION

In accordance with the invention, a photoelectrolysis cell for producing hydrogen from solar radiation is provided which comprises (a) an anodic electrode comprising at least one thin n-type semiconducting layer which has a bandgap ranging from about 0.5 to 4.0 eV and which is disposed on a supporting conductive substrate, (b) a cathodic counter-electrode, comprising at least one thin p-type semiconducting layer which has a bandgap ranging from about 0.5 to 4.0 eV and which is disposed on a supporting conductive substrate, the p-type layer adjacent the n-type layer such that incident solar radiation impinges substantially simultaneously on both the n- and p-type electrodes, (c) means for retaining an electrolyte in contact with the exposed surfaces of the n- and p-type semiconducting electrodes, (d) external bias means between the electrode and the counter-electrode for biasing the cell with from 0 to about 1 V, and (e) means for collecting the hydrogen and any oxidation products produced.

The adjacent configuration of the n- and p-type semiconducting electrodes with substantially simultaneous illumination permits use of semiconductors with smaller bandgaps. Such a configuration increases the solar absorptivity of each electrode and thus increases conversion efficiency. The sum of the bandgaps of the n- and p-type semiconducting electrodes with substantially simultaneous illumination also (a) eliminates the need for transparent, conducting substrates for the semiconducting electrodes, (b) allows for simple adjustment of relative areas to produce substantially equal rates of electron-hole pair generation in each of the n- and p-type electrodes (a condition required for maximum conversion efficiency) and (c) permits a thinner and more easily constructed cell to be fabricated.

The thin semiconducting electrodes may be either single crystal material, polycrystalline material (having a crystallite size ranging from about 25 A to 1 mm) or amorphous. Preferred n-type anodic materials include suitably doped $TiO_2$, $In_2O_3$, $SnO_2$, GaAs, GaP, $WO_3$, SiC, $Fe_2O_3$, CdS, $CuInS_2$, Si and the titanates $MTiO_3$, where M is at least one element of lanthanum, barium, strontium, the rare earth elements and the transition metal elements. Preferred p-type cathodic materials include suitably doped GaP, GaAs, Si, $Cu_2S$, $Cu_2O$, InP, ZnSe, CdTe and $CuInS_2$.

Graded bandgaps or multiple heterojunction semiconducting layers may be used for each electrode to more effectively utilize a larger portion of the solar spectrum.

For electrode materials which are not chemically stable, a thin, chemically inert, semiconducting layer may be disposed over the unstable semiconductor, as described more fully in application Ser. No. 632,557, filed Nov. 17, 1975 now U.S. Pat. No. 4,011,149 issued Mar. 8, 1977.

The electrolyte may be either liquid or solid having a specific conductivity at least about $10^{-3}$ ohm$^{-1}$–cm$^{-1}$. Liquid electrolytes may be acidic, neutral or basic. Solid electrolytes may comprise cationic or anionic polymeric membrane films, such as perfluorosulfonic acid polymer (also known as Nafion ®, a trademark of E.I. DuPont de Nemours and Co.) For the case of a solid polymer electrolyte, porous n- and p-type thin semiconducting films comprising the anode and cathode, respectively, of the photoelectrolysis cell are disposed adjacent each other on the polymer electrolyte film, resulting in a thin film cell with very low internal resistance and, hence, high conversion efficiency of solar energy into hydrogen.

Photosensitive dyes may also be incorporated in the electrolyte to sensitize wide bandgap electrodes to longer wavelength radiation and thereby increase the conversion efficiency of cells utilizing such electrodes.

DETAILED DESCRIPTION OF THE INVENTION

1. Basic Considerations

Photoelectrolysis is defined as a process whereby light absorbed in semiconducting electrodes of an electrochemical cell generates electron-hole pairs which are separated and injected into the electrolyte at the cathode and anode, respectively, to produce reduction and oxidation reactions. Hence, an overall photochemical reaction is achieved in two steps: (1) the electrons (and holes) are first created by photoexcitation of a semiconductor electrode, and (2) the electrons (and holes) drive chemical reactions in an electrochemical cell. Of prime importance is the possibility that this sequence can drive reactions at lower energy levels than can either direct photolysis or electrolysis acting independently.

The photoelectrolysis of water is governed by the following process:

$$H_2O(l) \rightarrow H_2(g) + \tfrac{1}{2} O_2(g) \qquad (1)$$

$$\Delta H^\circ = + 68.32 \text{ kcal/mole } (2.96 \text{ eV})$$

$$\Delta F^\circ = + 56.69 \text{ kcal/mole } (2.46 \text{ eV})$$

For the normal, that is, homogeneous, photolysis of $H_2O$, light with wavelengths less than 2420 A (5.1 eV) is required. This is because the first step in this reaction path involves electronic excitation of the water molecule to high-lying molecular orbitals; absorption of light by water is not appreciable at wavelengths above about 2500 A. However, the maximum photon energy available from the sun (at air mass two) is 4.0 eV, which corresponds to a wavelength of about 3200 A. Hence, direct homogeneous photolysis of water by sunlight is not possible. The actual spectral distribution of solar irradiance is shown in Table I.

Table I.

| Spectral Distribution of Solar Irradiance | | |
|---|---|---|
| Wavelength Interval, A | Photon Energy Interval, eV | Percent Solar energy (at air mass two*) |
| 3200 – 4000 | 4.0 – 3.1 | 2.8 |
| 4000 – 5000 | 3.1 – 2.5 | 12.7 |
| 5000 – 6000 | 2.5 – 2.1 | 15.4 |
| 6000 – 7000 | 2.1 – 1.8 | 15.1 |
| 7000 – 8000 | 1.8 – 1.6 | 13.3 |
| 8000 – 9000 | 1.6 – 1.4 | 7.7 |
| 9000 –10,000 | 1.4 – 1.2 | 4.4 |
| 10,000–25,000 | 1.2 – 0.5 | 29.0 |

*Air mass two is defined as the solar energy per unit area impinging on the earth's surface when the sun is 60° from its zenith.

For the normal electrolysis of liquid water, the theoretical decomposition potential is 1.23 eV. In a photoelectrolysis cell, the upper wavelength limit that can be used to decompose $H_2O$ is $12{,}400/1.23 = 10{,}000$ A. This value is derived by considering the absorption of two photons in the cell at $h\nu^3 = 1.23$ eV. The two electron-hole pairs provide the two Faradays at 1.23 eV required to satisfy the free energy requirements of reaction (1). The remaining 0.5 eV needed to satisfy the difference between the chemical energy created ($\Delta H$) and electrical free energy ($\Delta F$) used is provided by heat loss from the surroundings.

The details of the photoelectrolysis scheme can best be discussed within the framework of the theory of p-n junctions, Schottky barriers, and the photovoltaic effect. The conventional photoelectrolysis cell can be visualized as an n-p or semiconductor-metal junction which is split and electrolyte interposed between the halves. As a result, either a semiconductor/electrolyte/metal configuration (Schottky-type cell) or an n/electrolyte/p configuration (p-n type cell) is formed.

At the n-type electrode, hydroxyl anions (OH$^-$) combine with holes (h$^+$) to product oxygen and water:

$$2h^+ + 2OH^- \rightarrow \tfrac{1}{2} O_2 + H_2O \qquad (2)$$

At the p-type or metal electrode, protons (H$^+$) combine with electrons (e$^-$) to produce hydrogen:

$$2e^- + 2 H^+ \rightarrow H_2 \qquad (3)$$

In an aqueous electrolyte, reactions (2) and (3) occur at the same time. Incoming radiation $h\nu$ ($h$ is Planck's constant, $6.62 \times 10^{-27}$ erg sec, and $\nu$ is the frequency of the radiation in sec$^{-1}$) must be equal to or greater than the bandgap energy $E_g$ in order to generate electron-hole pairs.

Absorption of bandgap light ($h\nu > E_g$) in the n-electrode results in electron-hole pairs which separate in the space charge layer at the surface of the electrode. Hole injection proceeds into the electrolyte, while the electron moves into the bulk of the electrode and around the external circuit to the cathode (counter-electrode). An analogous process occurs when bandgap light is absorbed in a p-electrode.

If the system consists of a semiconductor/electrolyte/metal configuration, then the bandgap of the semiconductor must be sufficiently high to provide the energy to drive the photolytic reaction and to overcome other energy losses. The minimum bandgap consistent with these considerations is about 1.3 eV. If the system consists of an n/electrolyte/p semiconductor configuration, then the sum of the bandgaps of the two electrodes must be equal to the above-mentioned minimum energy. For the latter case, it is thus possible to greatly increase the conversion efficiency of solar radiation by substantially simultaneous illumination of n- and p-electrodes of smaller bandgaps, since smaller bandgap semiconductors absorb more light and hence provide higher conversion efficiency.

These considerations can be put into quantitative terms by making an energy balance for the absorbed photon. For the Schottky-type cell, the following energy balance can be written:

$$E_g - V_B - (E_c - E_f) = \Delta G/nF + v_a + v_c + iR + V_H \quad (4)$$

where $E_g$ is the bandgap of the semiconducting electrode, $V_B$ the band bending at the semiconductor-electrolyte junction, $E_c$ is the conduction band energy, $E_f$ is the Fermi level, $\Delta G/nF$ is the free energy per electron for the overall cell reaction (1.23 eV for $H_2O$ decomposition), $v_a$ and $v_c$ are the respective overpotentials at the anode and cathode, iR is the ohmic loss, and $V_H$ is the potential drop across the Helmholtz layers in the electrolyte.

The sum of the terms on the left side of Equation (4) represent the net photon energy (as an electron-hole pair) available for doing the electrochemical work indicated by the terms on the right side of Equation (4). For certain semiconductors, such as, for example $TiO_2$, an external anodic (reverse) bias is required in addition to the photon energy in order to satisfy the energy balance and allow the cell reaction to proceed. For cases where an external bias is present, a bias term, $E_B$, is added to the left side of Equation (4).

The efficiency of the Schottky-type of photoelectrolysis cell with respect to sunlight is limited by the minimum bandgap required to satisfy the energy balance of Equation (4). The available energy is always less than the bandgap by the extent of band bending at the surface of the semiconductor plus the energy difference between the Fermi level and the majority carrier band edge; the required energy for water splitting is greater than the thermodynamic value of 1.23 eV by the extent of the electrode overvoltages plus ohmic and Helmholtz layer losses. Precise determination of the maximum possible conversion efficiency has not yet been made, however.

Enhanced efficiencies for photoelectrolysis can be achieved in a cell in which the electrodes consist of n- and p-type semiconductors which are substantially simultaneously illuminated. Furthermore, these n-p cells can eliminate the need for the external bias which may be required when n- or p-type Schottky cells based on each separate semiconductor are used. The n- and p-type electrodes can be either the same semiconductor (homotype cell) or different semiconductors (heterotype cell). In either case, the semiconductors are appropriately doped to give n- and p-type conductivity.

Figure 1A:
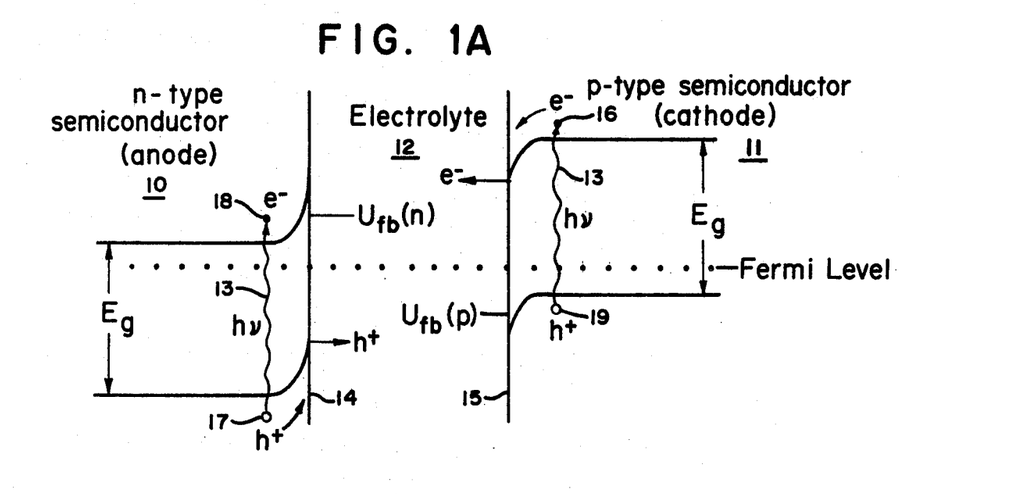
FIG. 1A is an energy level diagram for a simultaneously illuminated p-n homotype photoelectrolysis cell.
Figure 1B:
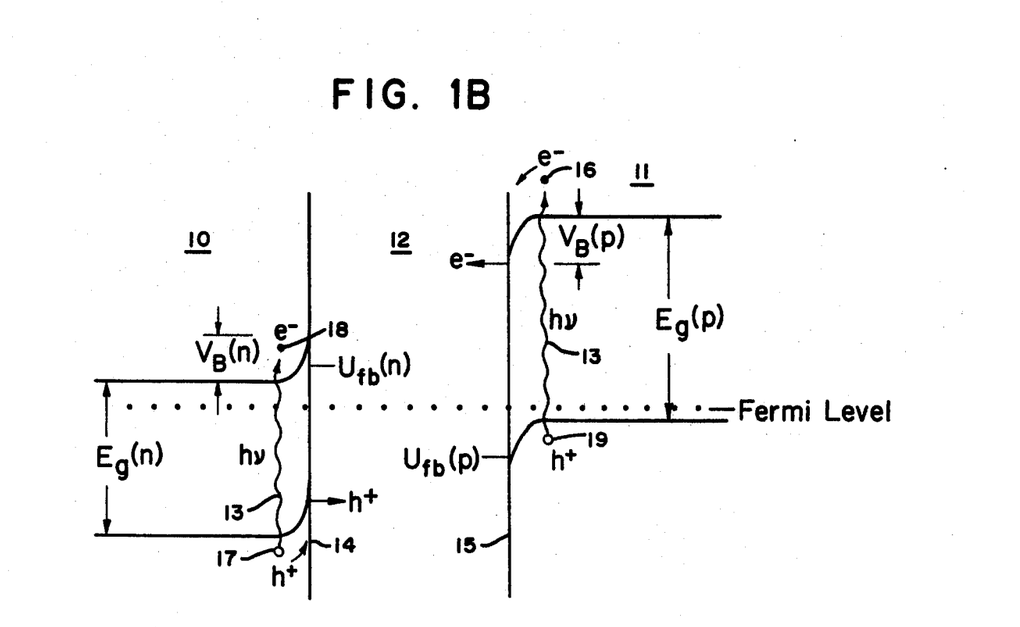
FIG. 1B is an energy level diagram for a simultaneously illuminated p-n heterotype photoelectrolysis cell.

FIGS. 1A–B depict energy level diagrams for both of these types of p-n photoelectrolysis cells.

In FIG. 1A, an energy level scheme for a homotype p-n cell is shown, while in FIG. 1B, an energy level scheme for a heterotype p-n cell is shown. Both cells comprise n-type anodic semiconductor electrode 10 and p-type cathodic semiconductor electrode 11. The electrodes are suspended in electrolyte 12. The electrodes are connected externally by an electrically conductive circuit, not shown, which may optionally include a bias means. Light 13 of energy hv is absorbed in both electrodes substantially simultaneously, creating electron-hole pairs in both the n-type semiconductor electrode and the p-type semiconductor electrode. The electrons and holes separate in each type of semiconductor under the influence of the junction potentials created at the n-type semiconductor/electrolyte interface 14 and p-type semiconductor/electrolyte interface 15. Thus, minority electrons 16 are injected into the electrolyte from the p-type semiconductor and minority holes 17 are injected into the electrolyte from the n-type semiconductor. These processes produce reduction reactions ($A^+ + e^- \rightarrow A$) at the p-type semiconductor/electrolyte interface and oxidation reactions ($B^- + h^+ \rightarrow B$) at the n-type semiconductor/electrolyte interface. Majority electrons 18 created in the n-type semiconductor and majority holes 19 created in the p-type semiconductor recombine in the external circuitry, and hence are not available for doing chemical work.

The gross effect in a p-n cell is a partial addition of the two bandgaps such that higher net photon energies become available for doing electrochemical work compared to a Schottky-type cell. For a given cell reaction, this leads to higher conversion efficiencies with respect to sunlight, since smaller bandgap semiconductors may be used. As is well-known, smaller bandgap semiconductors absorb a much larger fraction of the solar irradiance, and this results in higher conversion efficiency. This is illustrated in Table II, where the maximum possible short circuit current resulting from absorption of sunlight of air mass one in semiconductors is indicated as a function of their bandgap.

TABLE II

Dependence of Maximum Possible Short Circuit Currents on Semiconductor Bandgap.

| Semiconductor Bandgap, eV | Maximum Possible Short Circuit Current With Sunlight (at air mass one*), ma/cm² |
|---|---|
| 0.4 | 75 |
| 0.6 | 70 |
| 0.8 | 60 |
| 1.0 | 50 |
| 1.2 | 38 |
| 1.4 | 30 |
| 1.6 | 25 |
| 1.8 | 18 |
| 2.0 | 13 |
| 2.2 | 10 |
| 2.4 | 7.5 |

*Air mass one is defined as the solar energy per unit area impinging on the earth's surface when the sun is at its zenith.

The specific available photon energy depends upon the details of the p-n cell configuration and the semiconductor properties. For the general case of a heterotype p-n cell (FIG. 1B):

$$E_g(n) + E_g(p) - [U_{fb}(p) - U_{fb}(n)] + \Delta E_F(n) - \Delta E_F(p) = \Delta G/nF + v_a(n) + v_c(p) + iR + V_H \quad (5)$$

where (n) and (p) refer to the n and p-type semiconducting electrodes, respectively, $\Delta E_F$ is the energy difference between the band edge for the majority carriers and the Fermi level, and $U_{fb}$ is the flat-band potential of the semiconducting electrode. The latter is the electrode potential (with respect to the standard calomel electrode) at which the band bending, $V_B$, is equal to zero.

For the heterotype p-n cell, minimization of the difference between the flat-band potentials of the n- and p-type electrodes lead to maximization of the net available photon energy. In the upper limit, where this difference is zero and $\Delta E_F$ is negligible for both electrodes, the net available energy is equal to the sum of the bandgaps of the n- and p-type electrodes. Although this limiting condition can never be achieved in practice because of the necessity for finite band bending at the semiconductor-electrolyte junctions to facilitate efficient charge carrier separation, the net available energy in a practical system is considered to be substantially equal to the sum of the bandgaps.

For the homotype p-n cell (FIG. 1A), the electron affinities of the n- and p-type electrodes are equal. This leads to $$E_g = \Delta G/nf + \nu_a(n) + \nu_c(p) + iR + V_H \qquad (6)$$

Thus, the net available energy in this case is equal to the bandgap.

The details of the energetics are presented elsewhere and form no part of this invention; see Vol. 29, *Applied Physics Letters*, pp. 150–153 (1976).

A major difference between a Schottky-type and p-n type photoelectrolysis cell is that a one-photon process is operating in the former, while a two-photon process is operating in the latter. For the heterotype p-n cell, the two-photon process leads to energy upconversion in that the net potential energy available for doing chemical work is greater than the energy represented by one photon. In this sense, the operation of heterotype p-n photoelectrolysis cells is analogous to photosynthesis.

2. Cell Configuration

In accordance with the invention, a photoelectrolysis cell for producing hydrogen from solar radiation is provided which comprises (a) an anodic electrode comprising at least one thin n-type semiconducting layer which has a bandgap ranging from about 0.5 to 4.0 eV and which is disposed on a supporting conductive substrate; (b) a cathodic counter-electrode comprising at least one thin p-type semiconducting layer which has a bandgap ranging from about 0.5 to 4.0 eV and which is disposed on a supporting conductive substrate, the p-type layer adjacent the n-type layer such that incident solar radiation impinges substantially simultaneously on both the n- and p-type electrodes; (c) means for retaining an electrolyte in contact with the exposed surfaces of the n- and p-type semiconducting electrodes; (d) external bias means between the electrode and the counter-electrode for biasing the cell with 0 to about 1 V; and (e) means for collecting hydrogen and any oxidation products produced.

The n- and p-type layers are adjacent each other. They may be in physical contact, or, more preferably, separated by a small insulating section at least about 0.1 mm thick for increased efficiency. The conductive, supporting substrates may be opaque, comprising, for example, metal foils or sheets.

Combining the adjacent configuration with substantially simultaneous illumination permits use of semiconductors with smaller bandgaps, in contrast to prior art photoelectrolysis cells. Advantageously, simultaneous illumination utilizes a greater portion of the available solar energy than is possible with, for example, Schottky-type cells.

For maximum efficiency, the relative areas of the n- and p-type electrodes are adjusted such that substantially equal photon absorption rates are obtained. As discussed, above, in a simultaneously illuminated p-n photoelectrolysis cell, for two photons absorbed in the cell (one in each electrode), two electron-hole pairs are generated. In the photoelectrolysis process, these two electron-hole pairs become reconstituted such that one new electron-hole pair becomes available for driving chemical reactions, while the second new electron-hole pair is lost through recombination. The available electron-hole pair consists of photogenerated minority carriers injected from each semiconductor electrode, and is upconverted in energy. The lost electron-hole pair consists of photogenerated majority carriers which are formed in each electrode and which recombine in the external circuit. Since one minority electron from the p-type electrode must pair up with one minority hole from the n-type electrode in order for an electron-hole pair to become available for doing chemical work, any excess electron-hole pairs generated in one electrode are not useful for doing chemical work. Thus, such excess electron-hole pairs are lost, resulting in lower cell efficiency.

Knowledge of the bandgap of each semiconducting electrode and the resulting absorption characteristics (number of photons absorbed per cm$^2$) enables a determination to be made of the relative areas of the electrodes required such that the photon absorption rates (number of photons per sec) of the two electrodes are substantially equal.

Figure 2:
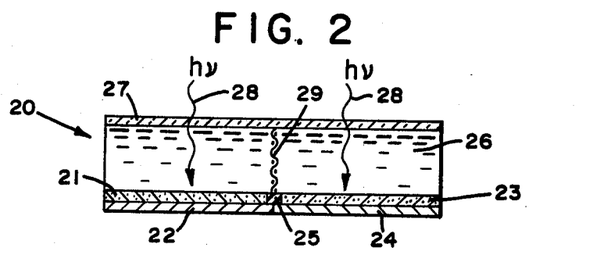
FIG. 2 is a cross-sectional view of an embodiment of the invention, utilizing thin, planar electrodes of n- and p-type semiconductors supported on conductive metal substrates, the p-type semiconductor adjacent the n-type semiconductor such that both n- and p-type electrodes are simultaneously illuminated.

An example of a cell configuration of the invention is shown in cross-section in FIG. 2. A cell, indicated generally at 20, comprises a thin n-type semiconducting layer 21 disposed on electrically conducting substrate 22 and a thin p-type semi-conducting layer 23, adjacent the n-type layer, disposed on electrically conducting substrate 24. The areas of the n- and p-type electrodes are such that substantially equal photon absorption rates are obtained. For maximum efficiency, the electrically conducting substrates, preferably metallic, form ohmic contacts to their respective semiconducting layers. A small insulating section 25 separates the n- and p-type layers for increased efficiency, while the conducting substrates are either connected directly together, as shown, or optionally connected through an external electrical bias (not shown). The electrodes and their metallic substrates conveniently form the bottom section of the cell. Aqueous electrolyte 26 flows through the cell. The electrolyte is replenished as needed by means not shown. The top 27 of the cell is transparent, allowing for passage of solar radiation 28 of energy $h\nu$. Simultaneous absorption of the solar radiation by the n- and p-type semiconductors result in O$_2$ evolution and H$_2$ evolution, respectively. A membrane 29, impermeable to H$_2$ and O$_2$, prevents mixing of the gases, but permits transport of electrolyte. The evolved gases are swept along with the electrolyte flow in their respective compartments, and at the exit of the cell (not shown), the gases are separated from the electrolyte by conventional means.

Figure 3:
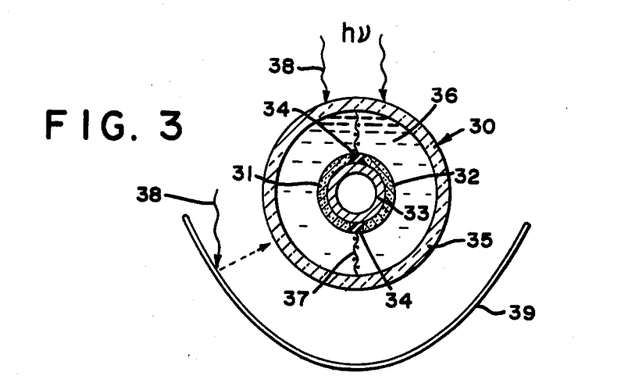
FIG. 3 is a cross-sectional view of an alternative embodiment of the invention, utilizing n- and p-type semiconducting electrodes which are adjacent each other and are disposed on alternate halves of a metallic supporting pipe such that both electrodes are simultaneously illuminated from all directions.

FIG. 3 depicts a cross-sectional view of a circular pipe structure, indicated generally at 30, which comprises the essential element of a continuous flow photoelectrolysis cell comprising anode 31 and cathode 32 which comprise an n-type thin film and a p-type thin film, respectively. The electrodes are adjacent each other and are simultaneously illuminated, using solar concentration techniques. The n- and p-type thin films are deposited on each half circle of a metallic tube 33 and are separated from each other by a small insulating section 34 for increased efficiency. The areas of the n- and p-type electrodes are such that substantially equal photon absorption rates are obtained. The metallic tube is enclosed by a concentric glass pipe 35, and electrolyte 36 flows through the annular space. $O_2$ and $H_2$ are evolved at anode 31 and cathode 32, respectively, and are prevented from mixing by gas separator 37. Solar radiation 38 impinges on all sides of the pipe, as illustrated by the dotted line, with the aid of solar concentrator 39, which may comprise a conventional reflector, such as a parabolic or a flat mirror, for example. $H_2$ and $O_2$ are carried along with the liquid electrolyte and are separated from the liquid at the exit of the pipe by means of conventional gas-liquid separation equipment (not shown). A conventional anodic electrical bias (not shown) between the n- and p-type electrodes is applied as needed to control the rate of $H_2$ and $O_2$ evolution. For maximum efficiency, contact of the n- and p-type electrodes to the metallic pipe is made through ohmic contact layers (not shown).

Figure 4:
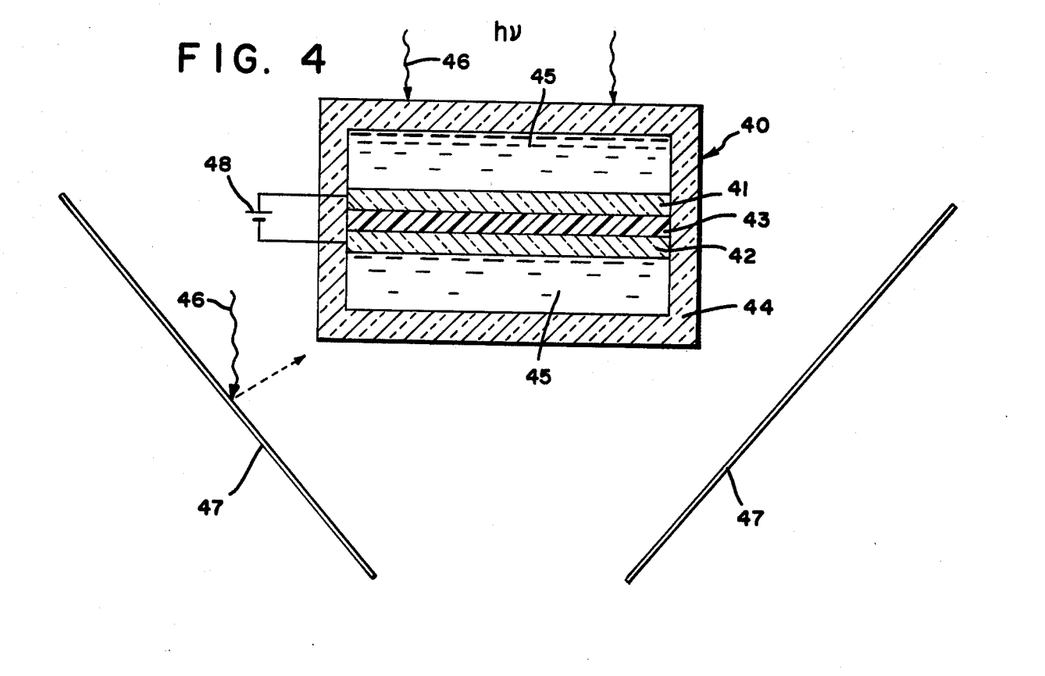
FIG. 4 is a cross-sectional view of an alternative embodiment of the invention, utilizing n- and p-type electrodes which are adjacent each other and are disposed on a thin film solid polymer electrolyte and simultaneously illuminated.

FIG. 4 depicts a cross-sectional view of a totally thin film photoelectrolysis cell 40 comprising anode 41 and cathode 42 which comprise an n-type thin film electrode adjacent a p-type thin film electrode, respectively. The electrodes are deposited on either side of a thin solid polymer electrolyte sheet 43. The areas of the electrodes are such that substantially equal photon absorption rates are obtained. The polymer sheet intersects a glass pipe 44 which has ordinary water 45 flowing through it in contact with both the n- and p-type sides of the polymer sheet. The sides of the glass pipe serve as an insulating section to separate the n- and p-type layers for increased efficiency. The semiconducting films are sufficiently porous to permit ionic contact between the water and the polymer electrolyte. Solar radiation 46 impinges on the cell and is absorbed simultaneously in both the n- and p-type semiconducting layers with the aid of solar concentrators 47, which may comprise conventional reflectors, for example. $O_2$ and $H_2$ are produced at the n- and p-type electrodes, respectively, and are collected and separated as described earlier. An anodic electrical bias is applied by bias means 48 as needed between the n- and p-type eV. The electrode materials must also be stable electrochemically and inert to any reactions in solution.

Preferred anode materials meeting these criteria are suitably doped n-type semiconductors such as $TiO_2$, $In_2O_3$, $SnO_2$, GaAs, GaP, $WO_3$, SiC, $Fe_2O_3$, CdS, $CuInS_2$, Si, and the titanates $MTiO_3$, where M is at least one element of barium, strontium, the rare earth elements (atomic number 57 to 71, inclusive) and the transition metal elements (Groups IB through VIIB and VIII of the Periodic Table). Examples of rare earth and transition metal titanates include $LaTiO_3$ and $NiTiO_3$, respectively.

To date, $TiO_2$, $WO_3$, $SrTiO_3$, $BaTiO_3$ and $Fe_2O_3$ are some of the most useful anode materials developed. However, these materials have wide bandgaps ($E_g >$ 2.5 eV), and their principle optical absorption is thus not in that region of the solar spectrum needed to obtain maximum efficiency. For such wide bandgap materials, however, there are methods to increase the efficiency. For example, graded bandgaps or multiple heterojunction semiconductor layers may be utilized, with the bandgap of each layer ranging from about 0.5 to 4.0 eV. This comprises joining together two or more semiconducting materials having different bandgaps such that a greater fraction of the solar irradiance is absorbed. For example, $TiO_2$ combined with CdS, GaP, GaAs, CdTe or Si results in solar absorbances ranging from about 25% to 70%; the solar absorption of $TiO_2$ alone is about 3% to 6%. Furthermore, such combinations permit use of semiconductors which by themselves are not chemically inert with respect to the electrolyte. This is accomplished by overcoating the chemically sensitive semiconductor, such as CdS or GaP, with an inert semiconductor layer, such as $TiO_2$, to protect the chemically sensitive semiconductor from chemical attack by the electrolyte. Conventional solar concentrators may be used to further increase conversion efficiency.

Preferred cathodic materials meeting the above criteria include suitably doped p-type semiconductors such as GaP, GaAs, Si, $Cu_2S$, $Cu_2O$, InP, ZnSe, CdTe and $CuInS_2$. Graded bandgaps or multiple heterojunction semiconductor layers may also be utilized.

While single crystal material may be employed, the electrodes of the invention preferably are in the form of thin films (about 500 A to 10 $\mu$m in thickness), and may be either polycrystalline, with a crystallite size ranging from about 25 A to 1 mm, or amorphous. The films are conveniently fabricated by conventional deposition procedures such as DC sputtering, RF sputtering, chemical vapor deposition, thermal evaporation, and anodization or thermal oxidation of metals.

The thin film semiconducting electrodes may be

B. Electrolyte

The electrolyte must have a sufficiently high conductivity in order to minimize cell resistance and reduce losses. Preferably, the specific conductivity is at least about $10^{-3}$ ohm$^{-1}$–cm$^{-1}$.

The electrolyte conveniently is an aqueous solution which is acidic, neutral or basic. Examples include 0.1N KOH and 0.2N $H_2SO_4$. Alternatively, a solid polymer electrolyte comprising a cationic or anionic polymeric membrane film may be employed. There are many advantages to using the latter: (1) the thin semiconducting electrode film can be deposited directly onto the polymer electrolyte film, which results in low internal resistance; (2) no free acid or base is present in the cell, which reduces chemical corrosion of the semiconductor electrode; and (3) both the n- and p-type thin film electrodes can be deposited on opposite sides of the polymer electrolyte membrane, which results in a totally thin film photoelectrolysis cell. An example of such a polymer electrolyte is a perfluorinated sulfonic acid polymer (also known as Nafion ®, a trademark of E. I. DuPont de Nemours and Co.) which is available in thicknesses ranging from about 0.005 to 0.015 inch.

For sensitizing wide bandgap electrodes to visible light, photosensitive dyes such as Rhodamine B, eosine, or crystal violet may be incorporated in the electrolyte to increase conversion efficiency.

C. Collection of Evolved Gases

The collection and storage of hydrogen gas produced by photoelectrolysis is easily accomplished by conventional techniques, such as pressurizable tanks, absorption of hydrogen by metals to form reversibly decomposable metal hydrides and the like. Other evolved gases and oxidation products, such as $O_2$ and $H_2O_2$, may be also collected and stored by conventional techniques if desired.

EXAMPLE 1

A $TiO_2$ crystal with a surface area of 0.8 cm$^2$ and a thickness of 1 mm was reduced in $H_2$ at 700° C for 1 hr to produce a conductivity of 0.3 ohm$^{-1}$cm$^{-1}$. An ohmic contact of 3000 A of In was evaporated onto one face and a wire was soldered to the In contact. The back of the crystal was coated with epoxy resin, leaving only the front surface exposed. A crystal of p-GaP with a conductivity of 3 ohm$^{-1}$cm$^{-1}$ and having a surface area of 0.5 cm$^2$ and a thickness of 1 mm was coated on one surface with 3000 A of a 1% Zn — 99% Au alloy. The Zn—Au coating was then overcoated with 1 µm of Au and heat-treated in $H_2$ at 600° C for 10 minutes to form an ohmic contact. A wire was soldered to the ohmic contact and the back of the crystal was coated with epoxy resin, leaving only the front surface exposed. The two n- and p-type crystal electrodes were then mounted adjacent each other in a photoelectrolysis cell such that both crystals could be simultaneously illuminated with simulated sunlight. The light passed through a quartz window before impinging upon the electrodes. The electrolyte in the cell was 0.2 $NH_2SO_4$. When the cell was operated with zero external bias and illuminated with simulated sunlight, $H_2$ evolved from the p-GaP crystal and $O_2$ evolved from the n-$TiO_2$ crystal. When an anodic bias was applied to the cell, the rate of gas evolution increased. The photocurrent and rate of gas evolution became saturated at a bias of about 0.5 volts; this rate was about 2-3 times that at zero bias. The conversion efficiency of this cell (optical power into $H_2$) was 0.3%.

EXAMPLE 2

A thin film of n-$TiO_2$ is RF-sputtered onto one-half of a titanium metal substrate. The thickness of the film is 3000 A. On the second half of the substrate a 3000 A film of 1% Zn — 99% Au is deposited by thermal evaporation. An insulating strip of epoxy resin is placed on the surface of the substrate between the n-$TiO_2$ and Au-Zn layers. A 1 µm film of p-GaP is then RF-sputtered over the Au-Zn lyer. The metal substrate is mounted in a photoelectrolysis cell and when both halves of the substrate are simultaneously illuminated with simulated sunlight, $H_2$ evolves from the p-GaP layer and $O_2$ evolves from the n-$TiO_2$ layer. If an electrical bias is applied between the n- and p-type electrodes, the rate of gas evolution is increased.

What is claimed is:

1. A photoelectrolysis cell for producing hydrogen using solar radiation comprising
   (a) an anodic electrode comprising at least one n-type semiconducting layer which has a bandgap ranging from about 0.5 to 4.0 eV and which is disposed on a supporting conductive substrate;
   (b) a cathodic counter-electrode comprising at least one p-type semiconducting layer which has a bandgap ranging from about 0.5 to 4.0 eV and which is disposed on a supporting conductive substrate, the p-type layer adjacent the n-type layer, with the n-type and p-type layers being either coplanar or disposed semicylindrically on an elongated, cylindrical substrate such that incident solar radiation impinges substantially simultaneously on both the n-type and p-type electrodes;
   (c) means for retaining an electrolyte in contact with the exposed surfaces of the n- and p-type semiconducting electrodes;
   (d) external bias means between the electrode and the counter-electrode for anodically biasing the anodic electrode relative to the cathodic counter-electrode with 0 to about 1 V; and
   (e) means for collecting hydrogen produced at the anodic electrode.

2. The cell of claim 1 further including means for collecting any oxidation products produced at the anodic electrode.

3. The cell of claim 1 in which the anodic electrode comprises a suitably doped n-type composition selected from the group consisting of $TiO_2$, $In_2O_3$, $SnO_2$, GaAs, GaP, $WO_3$, SiC, $Fe_2O_3$, CdS, $CuInS_2$, Si and $MTiO_3$, where M is at least one element selected from the group consisting of La, Ba, Sr, the rare earth elements and the transition metal elements.

4. The cell of claim 3 in which the anodic electrode comprises a semiconducting layer of n-type $TiO_2$.

5. The cell of claim 1 in which the counter-electrode comprises a suitably doped p-type composition selected from the group consisting of GaP, GaAs, Si, $Cu_2S$, $Cu_2O$, InP, ZnSe, CdTe and $CuInS_2$.

6. The cell of claim 5 in which the counter-electrode comprises a semiconducting layer of p-type GaP.

7. The cell of claim 1 in which the relative areas of the n- and p-type semiconducting electrodes are such that substantially equal rates of photon absorption are produced in each electrode when the cell is illuminated with solar radiation.

8. The cell of claim 1 in which the supporting conductive substrates are metallic.

9. The cell of claim 8 in which each of the metallic supporting conductive substrates in contact with the respective n- and p-type semiconducting electrodes comprises an ohmic contact.

10. The cell of claim 1 in which the electrode and counter-electrode are in the form of films of about 500 A to 10 μm in thickness.

11. The cell of claim 1 further including means for directing solar radiation onto at least a portion of at least one of the electrodes.

12. The cell of claim 1 in which the n-type and p-type layers are coplanar.

13. The cell of claim 12 in which the n-type and p-type layers are separated by an insulating section.

14. The cell of claim 1 in which the n-type and p-type layers are disposed semicylindrically on an elongated, cylindrical substrate.

15. The cell of claim 14 in which the n-type and p-type layers are separated by an insulating section.

16. A process for producing hydrogen using solar radiation comprising
   (a) exposing to solar radiation an anodic electrode in contact with an electrolyte in turn having a cathodic counter-electrode in contact therewith, the electrode comprising at least one n-type semiconducting layer which has a bandgap ranging from about 0.4 to 4.0 eV and which is disposed on a supporting conductive substrate, and the counter-electrode comprising at least one p-type semiconducting layer which has a bandgap ranging from about 0.5 to 4.0 eV and which is disposed on a supporting conductive substrate, the p-type layer adjacent the n-type layer, with the n-type and p-type layers being either coplanar or disposed semicylindrically on an elongated, cylindrical substrate, such that incident solar radiation impinges substantially simultaneously on both the n- and p-type semiconducting electrodes;
   (b) applying an anodic bias to the anodic electrode relative to the cathodic counter-electrode of 0 to about 1 V; and
   (c) collecting hydrogen produced at the cathodic counter-electrode.

17. The process of claim 16 further including collecting any oxidation products produced at the anodic electrode.

18. The process of claim 16 in which the anodic electrode comprises at least one suitably doped n-type composition selected from the group consisting of $TiO_2$, $In_2O_3$, $SnO_2$, GaAs, GaP, $WO_3$, SiC, $Fe_2O_3$, CdS, $CuInS_2$, Si and $MTiO_3$, where M is at least one element selected from the group consisting of La, Ba, Sr, the rare earth elements and the transition metal elements.

19. The process of claim 18 in which the anodic electrode comprises a semiconducting layer of n-type $TiO_2$.

20. The process of claim 16 in which the counter-electrode comprises a suitably doped p-type composition selected from the group consisting of GaP, GaAs, Si, $Cu_2S$, $Cu_2O$, InP, ZnSe, CdTe and $CuInS_2$.

21. The process of claim 20 in which the counter-electrode comprises a semiconducting layer of p-type GaP.

22. The process of claim 16 in which the relative areas of the n- and p-type semiconducting electrodes are adjusted such that substantially equal rates of photon absorption are produced in each electrode when the electrodes are illuminated with solar radiation.

23. The process of claim 16 in which the supporting conductive substrates are metallic.

24. The process of claim 23 in which each of the metallic supporting conductive substrates forms an ohmic contact to each of the respective n- and p-type semiconducting electrodes.

25. The process of claim 16 in which the electrolyte comprises an aqueous solution having a specific conductivity of at least about $10^{-3}$ ohm$^{-1}$cm$^{-1}$.

26. The process of claim 16 in which the electrolyte includes a photosensitive dye.

27. The process of claim 16 in which the electrode and counter-electrode are in the form of films of about 500 A to 10 μm in thickness.

28. A photoelectrolysis cell for producing hydrogen using solar radiation comprising
   (a) an anodic electrode comprising at least one porous n-type semiconducting layer which has a bandgap ranging from about 0.5 to 4.0 eV;
   (b) a cathodic counter-electrode comprising at least one porous p-type semiconducting layer which has a bandgap ranging from about 0.5 to 4.0 eV, with the n- and p-type layers either having an electrical conductivity of at least about 1 ohm$^{-1}$ cm$^{-1}$ or supported on electrically conducting porous substrates;
   (c) an opaque solid polymer electrolyte film interposed between the n-type and p-type semiconducting electrodes;
   (d) means for retaining water in contact with the exposed surfaces of the n- and p-type semiconducting electrodes;
   (e) external bias means between the electrode and the counter-electrode for anodically biasing the anodic electrode relative to the cathodic counter-electrode with 0 to about 1 V;
   (f) means for directing the solar radiation onto at least a portion of the electrodes; and
   (g) means for collecting hydrogen produced at the cathodic counter-electrode.

29. The cell of claim 28 further including means for collecting any oxidation products produced at the anodic electrode.

30. The cell of claim 28 further including means for directing solar radiation onto at least a portion of at least one of the electrodes.

31. The cell of claim 28 in which the n- and p-type layers have an electrical conductivity of at least about 1 ohm$^{-1}$cm$^{-1}$.

32. The cell of claim 28 in which the n- and p-type layers are supported on electrically conducting substrates.

33. The cell of claim 28 in which the anodic electrode comprises a suitably doped n-type composition selected from the group consisting of $TiO_2$, $In_2O_3$, $SnO_2$, GaAs, GaP, $WO_3$, SiC, $Fe_2O_3$, CdS, $CuInS_2$, Si, and $MTiO_3$, where M is at least one element selected from the group consisting of La, Ba, Sr, the rare earth elements and the transition metal elements.

34. The cell of claim 33 in which the electrode comprises a semiconductor layer of n-type $TiO_2$.

35. The cell of claim 28 in which the counter-electrode comprises a suitably doped p-type composition selected from the group consisting of GaP, GaAs, Si, $Cu_2S$, $Cu_2O$, InP, ZnSe, CdTe and $CuInS_2$.

36. The cell of claim 35 in which the counter-electrode comprises a semiconducting layer of p-type GaP.

37. The cell of claim 28 in which the relative areas of n- and p-type semiconducting electrodes are such that substantially equal rates of photon absorption are produced in each electrode when the cell is illuminated with solar radiation.

38. The cell of claim 28 in which the supporting conductive substrates are metallic.

39. The cell of claim 38 in which each of the metallic supporting conductive substrates in contact with the respective n- and p-type semiconducting electrodes comprises an ohmic contact.

40. The cell of claim 28 in which the electrode and counter-electrode are in the form of films of about 500 Å to 10 $\mu$m in thickness.

41. A process for producing hydrogen using solar radiation comprising
   (a) exposing to solar radiation an anodic electrode in contact with an electrolyte in turn having a cathodic counter-electrode in contact therewith, the electrode comprising at least one porous n-type semiconducting layer which has a bandgap ranging from about 0.5 to 4.0 eV and the counter-electrode comprising at least one porous p-type semiconducting layer which has a bandgap ranging from about 0.5 to 4.0 eV, with the n- and p-type layers either having an electrical conductivity of at least about 1 $ohm^{-1} cm^{-1}$ or supported on electrically conducting porous substrates, the p-type layer separated from the n-type layer by an opaque solid polymer electrolyte film;
   (b) applying an anodic bias to the anodic electrode relative to the cathodic counter-electrode of 0 to about 1 eV; and
   (c) collecting hydrogen produced at the cathodic counter-electrode.

42. The process of claim 41 further including collecting any oxidation products produced at the anodic electrode.

43. The process of claim 41 in which the electrode comprises at least one suitably doped n-type composition selected from the group consisting of $TiO_2$, $In_2O_3$, $SnO_2$, GaAs, GaP, $WO_3$, SiC, $Fe_2O_3$, CdS, $CuInS_2$, Si and $MTiO_3$, where M is at least one element selected from the group consisting of La, Ba, Sr, the rare earth elements and the transition metal elements.

44. The process of claim 43 in which the electrode comprises a semiconducting layer of n-type $TiO_2$.

45. The process of claim 41 in which the counter-electrode comprises a suitably dopes p-type composition selected from the group consisting of GaP, GaAs, Si, $Cu_2S$, $Cu_2O$, InP, ZnSe, CdTe and $CuInS_2$.

46. The process of claim 45 in which the counter-electrode comprises a semiconducting layer of p-type GaP.

47. The process of claim 41 in which the relative areas of the n- and p-type semiconducting electrodes are adjusted such that substantially equal rates of photon absorption are produced in each electrode when the electrodes are illuminated with solar radiation.

48. The process of claim 41 in which the supporting conductive substrates are metallic.

49. The process of claim 48 in which each of the metallic supporting conductive substrates forms an ohmic contact to each of the respective n- and p-type semiconducting electrodes.

50. The process of claim 41 in which the solid polymer electrolyte has a specific conductivity of at least about $10^{-3} ohm^{-1} cm^{-1}$.

51. The process of claim 41 in which the electrode and counter-electrode are in the form of films of about 500 Å to 10 $\mu$m in thickness.

* * * * *

UNITED STATES PATENT AND TRADEMARK OFFICE
CERTIFICATE OF CORRECTION

PATENT NO. : 4,090,933
DATED : May 23, 1978
INVENTOR(S) : Arthur J. Nozik

It is certified that error appears in the above-identified patent and that said Letters Patent are hereby corrected as shown below:

Col. 2, line 50, "A" should read -- $\overset{\circ}{A}$ --

Col. 4, line 3, "A" should read -- $\overset{\circ}{A}$ -- line 8, "A" should read -- $\overset{\circ}{A}$ -- line 10, "A" should read -- $\overset{\circ}{A}$ -- line 30, "A" should read -- $\overset{\circ}{A}$ --

Col. 5, line 24, "$\nu_a + \nu_c$" should read -- $\eta_a + \eta_c$ -- line 31, "$\nu_a$ and $\nu_c$" should read -- $\eta_a$ and $\eta_c$ --

Col. 6, line 65, "$\nu_a(n) + \nu_c(p)$" should read -- $\eta_a(n) + \eta_c(p)$ --

Col. 7, line 26, "$\nu_a(n) + \nu_c(p)$" should read -- $\eta_a(n) + \eta_c(p)$ --

Col. 13, line 9, "A" should read -- $\overset{\circ}{A}$ --

UNITED STATES PATENT AND TRADEMARK OFFICE
CERTIFICATE OF CORRECTION

PATENT NO. : 4,090,933

DATED : May 23, 1978

INVENTOR(S) : Arthur J. Nozik

It is certified that error appears in the above-identified patent and that said Letters Patent are hereby corrected as shown below:

Col. 14, line 16, "A" should read -- $\overset{\circ}{A}$ -- line 64, "semiconductor" should read -- semiconducting --

Col. 15, line 16, "A" should read -- $\overset{\circ}{A}$ -- line 35, "1 eV" should read -- 1 V --

Col. 16, line 14, "dopes" should read -- doped -- line 36, "A" should read -- $\overset{\circ}{A}$ --

Signed and Sealed this

Twentieth Day of May 1980

[SEAL]

Attest:

SIDNEY A. DIAMOND

*Attesting Officer*  *Commissioner of Patents and Trademarks*